Jan. 11, 1927.　　　J. B. DES ROSIERS　　　1,614,426
TRANSMISSION TOOL
Filed Feb. 4, 1926　　2 Sheets-Sheet 2
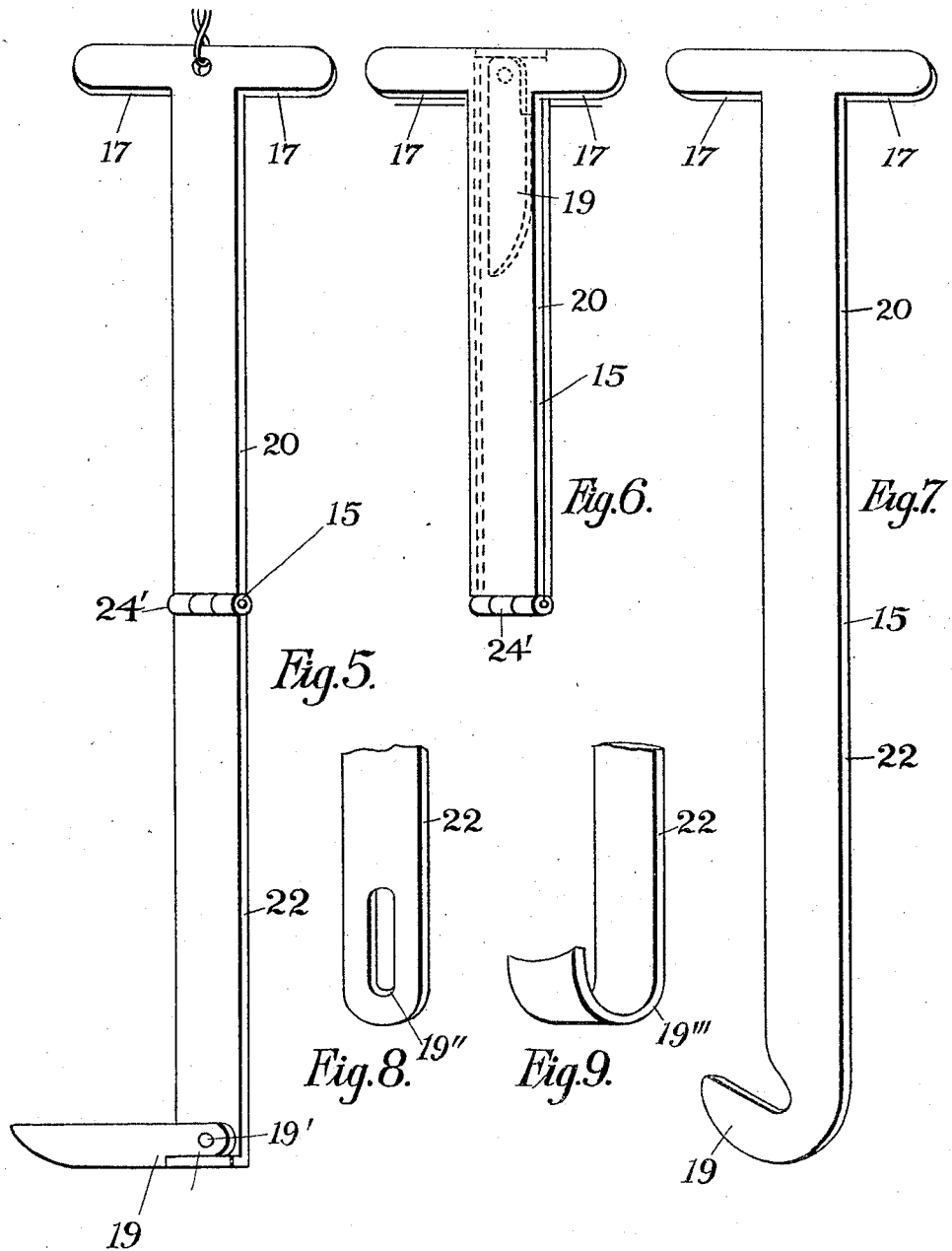

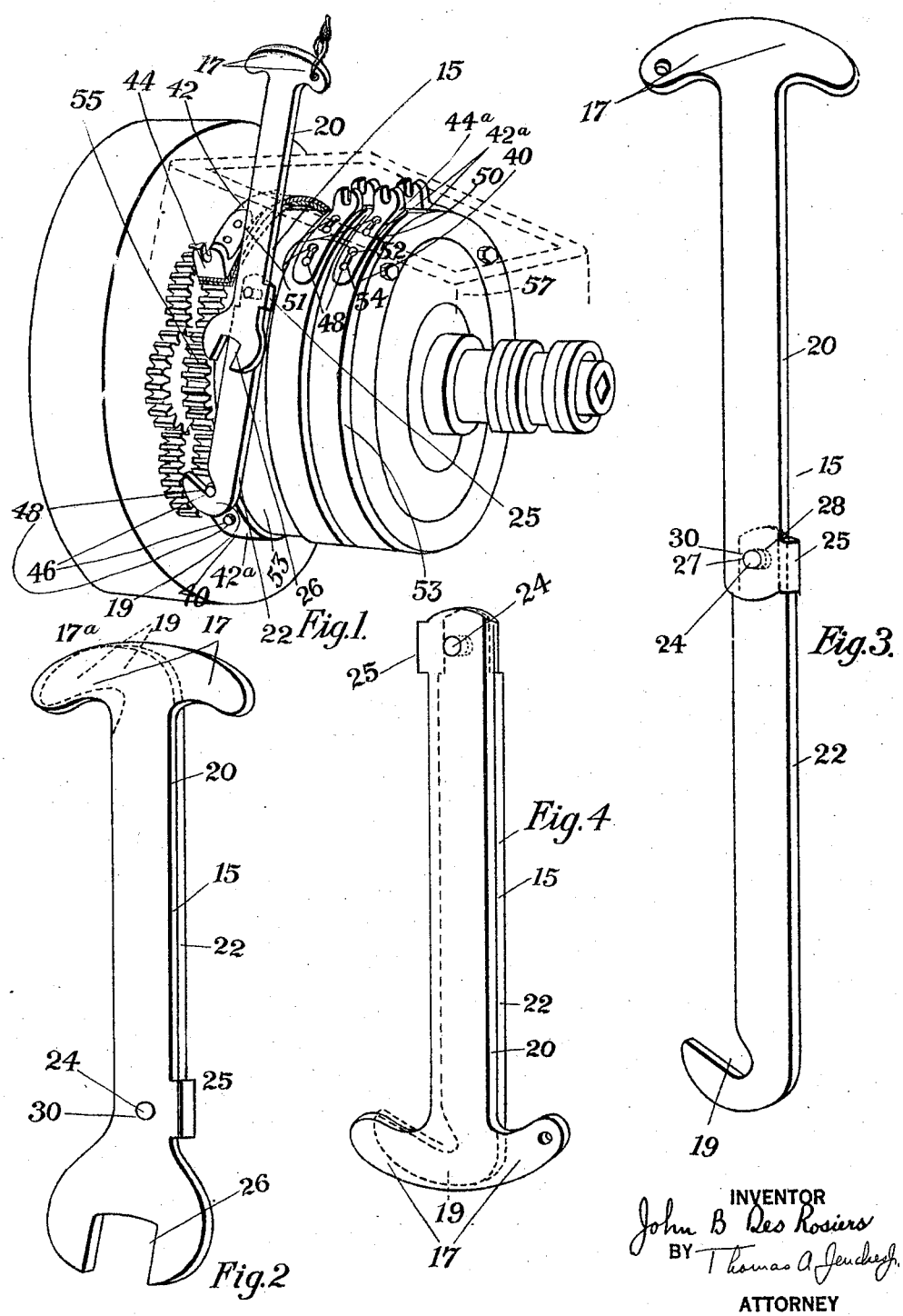

Patented Jan. 11, 1927.

1,614,426

UNITED STATES PATENT OFFICE.

JOHN B. DES ROSIERS, OF PROVIDENCE, RHODE ISLAND, ASSIGNOR TO DES ROSIERS PATENTS COMPANY, INC., OF PROVIDENCE, RHODE ISLAND, A CORPORATION OF RHODE ISLAND.

TRANSMISSION TOOL.

Application filed February 4, 1926. Serial No. 85,982.

My invention relates to assembling tools, particularly of the type adapted for use in assembling the so called detachable brake bands now employed on new model Ford automobiles. The new model detachable brake bands employed therein are provided on the outer periphery thereof near one loose end thereof with radially projecting bolts. Detachable band ears having slots therein are adapted to be detachably secured underneath the heads of these radial bolts after the bands minus the detachable band ears have been replaced in adjusted position on said automobile. In order to attach a transmission band one end thereof is inserted through the open crank case covering and around the planetary gearing in the transmission box and slid backwards on to its respective transmission drum. It is necessary in some manner to clasp the encircling end of the transmission band and to pull it into proper position on its respective transmission drum.

The main object of my invention is to provide a suitable tool for this purpose. As there is very little room between the respective transmission band and the sides of the crank case it was necessary to construct a tool of small width. To this end I have provided a tool comprising a flat elongated metal bar having lateral extensions on the upper end thereof forming a handle and bolt engaging means at the lower end thereof preferably comprising a flat bolt engaging hook. As the preferred embodiment of my invention is flat it may be readily inserted to grasp the bolt on the loose end of the transmission band as it comes into position around the planetary gearing and by pulling on the handle of my device said band may be readily pulled backwards and into position on its respective transmission band. The detachable band ears may then be attached to the ends of the transmission bands and they may be aligned as usual.

As explained, the device in its preferred form is flat to permit it to be inserted between the planetary gearing, transmission bands and the side of the crank case and as it is flat it may very conveniently and cheaply be stamped out of sheet metal stock.

A further object of my invention is to provide a device in two pieces pivotally joined together, one piece comprising a handle element and the other piece comprising a hook element, whereby said members may be pivoted from an open to a closed compact position and vice versa and means on said members to align said members both in open and closed position. When in open position it is obvious that a tool will be provided having a handle at its upper end and bolt engaging means at its lower end for use for the purpose described and that I have also provided a tool which may be folded into a compact closed position to take up a minimum amount of space in the small place usually allotted in a Ford tool kit. After the respective transmission band has been brought into operative position on its respective transmission drum, and the detachable band ears inserted thereon, it is usually necessary to have a wrench to firmly secure said transmission band in position around the drum. In the preferred embodiment of my invention I shape the lower end of the handle member into a wrench for this purpose and I preferably construct the hook of a shape corresponding to one lateral handle extension. It is thus obvious that when the hook member is pivoted to a closed position that the hook portion of the hook member will lie adjacent to a handle extension of the handle member to form part of the handle and that the opposite end of the handle member will project down in operative position for use as a wrench.

A further object of my invention is to provide a combination hook and wrench for use in assembling transmission bands.

These and such other objects of my invention as may hereinafter appear will be best understood from a description of the accompanying drawings, which illustrate various embodiments of my invention.

In the drawings, Fig. 1 is a perspective view of the crank case of an automobile, showing my invention in use in bringing a detachable transmission band into operative position on its perspective transmission drum.

Fig. 2 is a perspective view of the preferred embodiment of my invention in closed position.

Fig. 3 is a perspective view of a modified form of my invention in open position.

Fig. 4 is a perspective view of the modification shown in Fig. 3 in closed position.

Fig. 5 is a perspective view of a further modified form of my invention in open position.

Fig. 6 is a perspective view of the embodiment shown in Fig. 5 in closed position.

Fig. 7 is a perspective view of a further embodiment of my invention.

Fig. 8 illustrates a modified form of a hook which may be employed.

Fig. 9 illustrates a further modified form of hook which may be employed on my invention.

In the drawings, wherein like characters of reference indicate like parts throughout, 15 generally indicates my invention. As stated, my invention comprises a flat elongated metal bar 15 having the preferably flat lateral extensions 17 at the upper end thereof to form the handle and bolt engaging means 19 at the lower end thereof. I employ the terms "upper and lower" in reference to the position the parts of my invention 15 take in use.

The preferred embodiment of my invention as shown in Fig. 1 in open position and in Fig. 2 in closed position, preferably comprises the handle member 20, the hook member 22 and means 24 to pivotally attach the upper end of the hook member to the lower end of the handle member. In this embodiment the preferably flat handle member 20 is provided with preferably arcuate handle extensions 17 at the upper end thereof forming a handle and a stop lug 25 at one side near the lower end thereof. In this embodiment the preferably flat handle member 20 has its lower end shaped in the form of a wrench 26. The hook member 22 has its lower end provided with a preferably flat arcuate hook 19 projecting laterally thereof preferably of substantially equal radius with the radius of the handle extensions 17. As the preferred embodiment of means to pivotally attach the upper end of the hook member 22 to the lower end of the handle member 20 I preferably provide the upper end of the hook member 22 with the hole 27 and the lower end of the handle member 20 with the hole 28 and I permanently secure within said holes the pintle 30.

The operation of my invention is thus obvious from the above description. When the preferred embodiment 15 is pivoted to open position, it is obvious that the stop lug 25 will align the handle member 20 with the hook member 22 to retain said members in substantial alignment, and to provide said device with a bolt engaging hook 19 at the lower end thereof and a handle 17 at the upper end. When said respective handle and hook members are relatively pivoted to the closed position shown in Fig. 2 it is obvious that the arcuate hook portion 19 of the hook member 22 will lie substantially adjacent to the arcuate handle extension 17ª and being of a substantially equal radius of curvature therewith will cooperate to form part of the handle for said device, that the opposite side of said hook member than the side which abuts said stop lug 25 in open position will abut the stop lug 25 to keep said members in substantial alignment and that the wrench end 26 of said handle member will project down in operative position, said device then forming the wrench 26 provided with the handle 17 composed of the lateral extensions 17 and the adjacent hook 19 as shown in Fig. 2. It is obvious that in place of the stop lug 25 any suitable means to align said members both in open and closed position may be provided.

Figs. 3 and 4 illustrate an embodiment of my invention identical in construction to that shown in Figs. 1 and 2 with the exception that the lower end of the handle member is not formed into the wrench portion 26.

Figs 5 and 6 illustrate a further modified form of my invention wherein the means to pivotally attach the upper end of the hook member to the lower end of the handle member comprises the hinge 24′, wherein the lateral extensions 17 which form the handle project at an angle to the handle 20 rather than arcuately as shown in my preferred embodiment and wherein the hook 19 is pivotally attached by means of the pintle 19′ to the lower end of the hook member 22 whereby in closed position it may be conveniently folded up out of the way as shown in Fig. 6.

Fig. 8 illustrates a further modified form of hook which may be used in place of the hooks shown in Figs. 1–5. In this embodiment the hook comprises the slot 19″ in the lower end of the hook member 2.

Fig. 9 illustrates a further modified form of bolt engaging means 19 on the lower end of the hook member thereof which instead of comprising a hook projecting laterally from said member parallel with said member comprises a hook 19‴ formed by bending the entire lower end of the hook member 22 arcuately outwardly and upwardly.

Fig. 7 illustrates an embodiment of my invention 15 wherein the hook member 22 and the handle member 20 are integrally united to form the solid metal bar 15 provided with the handle extensions 17 at the upper end and the hook 19 projecting from the lower end.

Fig. 1 illustrates my invention in use in assembling the new type of detachable transmission bands on its respective transmission drum on a Ford automobile. The new type of detachable Ford transmission band comprises the circular band 40 cut at a point on its periphery to form the usual ends 42. Instead however, of firmly attaching both band ears 44 to the outer peripheries of the respective ends 42 of said band 40 one is detachably secured thereto in the following manner. The outer periphery of the end 42ª of said brake band is provided with the two bolts 46 projecting radially outwardly therefrom provided with the bolt heads 48. The detachable band ear 44ª is provided with a peripheral extension 50, said extension being provided with the oval slots 51, the upper portions 52 thereof being of larger width than the lower portions 54 thereof. The peripheral extension 50 of the band ear 44ª is then placed in position over the bolts 46, and is inserted under the bolt heads 48 through the portions 52 of larger width of said oval slots 51. When the band ear 44ª is drawn up into assembled position, it is obvious that the bolts 46 will slide into the portion 54 of smaller width thereby permitting the bolt heads 48 to firmly retain said ear 44ª to said brake band 40. The band ear 44ª is detachably removed from the band 40 in reverse manner from that just explained when the transmission bands 40 may be pulled off their respective drums.

To provide convenient means for attaching a transmission band to its respective transmission drum 53 is the purpose of my invention. In doing this one end 42ª of a transmission band 40 is placed around the planetary gearing 55 in front of the transmission drums 53 and by revolving the transmission band 40 therearound the bolts 46 on one end 42ª of the drum 40 will slide into accessible position. My transmission tool 15 is then inserted between the transmission drum 53, planetary gears 55 and the side 57 of the crank case and being preferably of a flat shape will readily fit therein. As my invention during this operation will stay in vertical alignment the hook portion 19 thereof may be readily manipulated by means of the handle 17 so that it may be inserted around a bolt 46 between the head 48 and the periphery of the band 40. The hook 19 will then engage the bolt 46 as explained and on upward and backward pressure on my invention 15, the band may be drawn further circumferentially around the planetary gearing and backwards into position on its respective transmission drum 53. When it is brought into proper position the detachable band ear 44ª may be inserted thereon as explained and the transmission bands aligned preferably by employing the device of my former Patent #1,512,678. Where the preferred embodiment of my invention is employed, the wrench 26 thereof may be employed to attach the transmission bolts to the respective transmission band ears 42. It is obvious that I have provided an assembly tool which may be readily stamped out of sheet metal stock, which takes up a small amount of room to accomplish the result desired and which may be readily folded into a compact position when not in use and which may if desired be provided with a wrench attachment, the hook portion then functioning as part of the handle of the wrench.

It is understood that my invention is not limited to the specific embodiments shown and that various deviations may be made therefrom without departing from the spirit and scope of the appended claims.

What I claim as new and desire to secure by Letters Patent is:

1. A device for use in assembling transmission bands, comprising a flat handle member having arcuate lateral extensions at the upper end thereof forming a handle, a stop lug at one side thereof near the lower end thereof, and its lower end shaped in the form of a wrench, a flat hook member having its lower end provided with a flat arcuate hook projecting laterally thereof of a substantially equal radius with the radius of the handle extensions and means to pivotally attach the upper end of said hook member to the lower end of said handle member whereby when said members are in open position, said device may have a hook at its lower end and a handle at its upper end, and a side of the upper end of the hook member may abut the stop lug at the lower end of the handle member to retain said members in substantial alignment and when said members are relatively pivoted to closed position, the arcuate hook portion of the hook member may lie substantially adjacent to an arcuate handle extension to form a part of the handle of said device, the opposite side of said hook member may abut said lug to keep said members in substantial alignment and the wrench end of said handle member may project down in operative position, said device then forming a wrench provided with a handle.

2. A device for use in assembling transmission bands, comprising a flat handle member having lateral extensions at the upper end thereof forming a handle, a stop lug at one side thereof near the lower end thereof, and its lower end shaped in the form of a wrench, a flat hook member having its lower end provided with a flat hook projecting laterally thereof and means to pivotally attach the upper end of said hook member to the lower end of said handle member whereby when said members are in open position said device may have a hook at its lower end and a handle at its upper end, and a side of the upper end of the hook member may abut the stop lug at the lower end of the handle member to retain said members in substantial alignment and when said members are relatively pivoted to closed position, the hook portion of the hook member may lie substantially adjacent to a handle extension to form a part of the handle of said device, the opposite side of said hook member may abut said stop lug to keep said members in substantial alignment and the wrench end of said handle member may project down in operative position, said device then forming a wrench provided with a handle.

3. A device for use in assembling transmission bands, comprising a handle member having arcuate lateral extensions at the upper end thereof forming a handle, a stop lug at one side thereof near the lower end thereof, and its lower end shaped in the form of a wrench, a hook member having its lower end provided with an arcuate hook projecting laterally thereof of substantially equal radius with the radius of the handle extensions and means to pivotally attach the upper end of said hook member to the lower end of said handle member whereby when said members are in open position, said device may have a hook at its lower end and a handle at its upper end and the side of the upper end of the hook member abutting the stop lug at the lower end of the handle member to retain said members in substantial alignment and when said members are relatively pivoted to closed position the arcuate hook portion of the hook member may lie substantially adjacent to an arcuate handle extension to form a part of the handle of said device, the opposite side of said hook member may abut said stop lug to keep said members in substantial alignment and the wrench end of said handle member may project down in operative position, said device then forming a wrench provided with a handle.

4. A device for use in assembling transmission bands, comprising a member having lateral extensions at the upper end thereof forming a handle, a stop lug at one side thereof near the lower end thereof, and its lower end shaped in the form of a wrench, a hook member having its lower end provided with a hook projecting laterally thereof, and means to pivotally attach the upper end of said hook member to the lower end of said handle member whereby when said members are in open position, said device may have a hook at its lower end and a handle at its upper end and a side of the upper end of the hook member abutting the stop lug at the lower end of the handle member to retain said members in substantial alignment and when said members are relatively pivoted to closed position, the hook of the hook member may lie substantially adjacent to a handle extension to form a part of the handle of said device, the opposite side of said hook member may abut said stop lug to keep said members in substantial alignment and the wrench end of said handle member may project down in operative position, said device then forming a wrench provided with a handle.

5. A device for use in assembling transmission bands, comprising a flat handle member having arcuate lateral extensions at the upper end thereof forming a handle and its lower end shaped in the form of a tool, a hook member having its lower end provided with a flat arcuate hook projecting laterally thereof of substantially equal radius with the radius of the handle extensions and means to pivotally attach the upper end of said hook member to the lower end of said handle member whereby when said members are in open position, said device may have a hook at its lower end and a handle at its upper end and when said members are relatively pivoted to closed position, the arcuate hook portion of the hook member may lie substantially adjacent to an arcuate handle extension to form a part of the handle of said device and the tool end of said handle member may project down in operative position, said device then forming a tool provided with a handle and means on said members to keep said members in alignment in both open and closed positions.

6. A device for use in assembling transmission bands, comprising a flat handle member having arcuate lateral extensions at the upper end thereof forming a handle and a stop lug at one side thereof near the lower end thereof and a hook member having its lower end provided with a flat arcuate hook projecting laterally thereof of substantially equal radius with the radius of the handle extensions and means to pivotally attach the upper end of said hook member to the lower end of said handle member whereby when said members are in open position, a side of the upper end of the hook member may abut the stop lug at the lower end of the handle member to retain said members in substantial alignment and when said members are relatively pivoted to closed position, the arcuate hook portion of the hook member may lie substantially adjacent to an arcuate handle extension to form a part of the handle of said device and the opposite side of said hook member may abut said stop lug to keep said members in substantial alignment.

7. A device for use in assembling transmission bands, comprising a handle member having lateral extensions at the upper end thereof forming a handle and a stop lug at one side thereof near the lower end thereof, a hook member having its lower end provided with a hook projecting laterally thereof and means to pivotally attach the upper end of said hook member to the lower end of said handle member whereby when said members are in open position a side of the upper end of the hook member may abut the stop lug at the lower end of the handle member to retain said members in substantial alignment and when said members are relatively pivoted to closed position, the hook portion of the hook member may lie substantially adjacent to a handle extension to form a part of the handle of said device and the opposite side of said hook member may abut said stop lug to keep said members in substantial alignment.

8. A device for use in assembling transmission bands, comprising a handle member having lateral extensions at the upper end thereof forming a handle, a hook member having its lower end provided with a hook projecting laterally thereof and means to pivotally attach the upper end of said hook member to the lower end of said handle member whereby when said members are relatively pivoted to closed position the hook portion of the hook member may lie substantially adjacent to a handle extension to form a part of the handle of said device and means on said members to keep said members in alignment in both open and closed positions.

In testimony whereof I affix my signature.

JOHN B. DES ROSIERS.